(12) United States Patent
Dague et al.

(10) Patent No.: US 7,472,186 B2
(45) Date of Patent: Dec. 30, 2008

(54) METHOD FOR USING SNMP AS AN RPC MECHANISM FOR EXPORTING THE DATA STRUCTURES OF A REMOTE LIBRARY

(75) Inventors: Sean Leo Dague, Poughkeepsie, NY (US); Konrad Rzeszutek, Somerville, MA (US); Kurt Russell Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 10/937,667

(22) Filed: Sep. 9, 2004

(65) Prior Publication Data

US 2006/0053210 A1    Mar. 9, 2006

(51) Int. Cl.
*G06F 15/173* (2006.01)
(52) U.S. Cl. .............. 709/224; 709/217; 709/218; 709/219; 709/223; 379/100.01; 379/100.03; 379/110.01; 710/5; 710/8
(58) Field of Classification Search ......... 709/217–219, 709/223–224, 227; 711/1; 379/100.01–100.03, 379/110.01, 111, 112.06–112.08, 137; 710/5, 710/8; 370/352; 340/508, 521
See application file for complete search history.

(56) References Cited

U.S. PATENT DOCUMENTS

| | | | | |
|---|---|---|---|---|
| 5,958,010 A | * | 9/1999 | Agarwal et al. | 709/224 |
| 6,289,334 B1 | * | 9/2001 | Reiner et al. | 707/3 |
| 6,513,065 B1 | * | 1/2003 | Hafez et al. | 709/224 |
| 6,560,647 B1 | * | 5/2003 | Hafez et al. | 709/224 |
| 6,606,660 B1 | * | 8/2003 | Bowman-Amuah | 709/227 |
| 2002/0065864 A1 | * | 5/2002 | Hartsell et al. | 709/100 |
| 2006/0069926 A1 | * | 3/2006 | Ginter et al. | 713/194 |
| 2007/0250468 A1 | * | 10/2007 | Pieper | 707/1 |
| 2008/0052387 A1 | * | 2/2008 | Heinz et al. | 709/223 |
| 2008/0052393 A1 | * | 2/2008 | McNaughton et al. | 709/224 |

* cited by examiner

*Primary Examiner*—Thu Ha T Nguyen
(74) *Attorney, Agent, or Firm*—Duke W. Yee; Casimer K. Salys; LaRhonda Jefferson-Mills

(57) ABSTRACT

A semi-automatic mapping of a library definition to a simple network management protocol (SNMP) management information base (MIB). By exposing the internal data needed to remotely access arbitrary user space libraries as SNMP data structures which can be directly modified over the network, the internal data, its operations, and usages operations can be modeled remotely.

1 Claim, 2 Drawing Sheets

METHOD FOR USING SNMP AS AN RPC MECHANISM FOR EXPORTING THE DATA STRUCTURES OF A REMOTE LIBRARY

BACKGROUND OF THE INVENTION

1. Technical Field

The present invention relates generally to remotely accessing and running a program, and particularly to a remote procedure call (RPC) mechanism for arbitrary user space libraries over existing system management protocols.

2. Description of Related Art

The advance of networked computer systems has made it possible to remotely access and run programs that are not locally stored on a user's physical computer. In other words, a user may access and run a program from across a network connection, where the libraries and other aspects of a program are stored at a distant location. Traditionally, to provide remote access to a library one had to use a Sun Microsystems RPC mechanism or some other RPC, such as XML-RPC. The reliance of a standard RPC mechanism for remote invocation has drawbacks, as it forces user applications to use low-level functional interfaces to access the remote libraries. There are also known security and dependency concerns with traditional RPC. For this reason there are very few instances of user applications designed to interface natively with RPC.

Simple Network Management Protocol (SNMP) is one of the most popular management protocols. Many vendor tools support SNMP interfaces, and a large percentage of all enterprise class computer and switch hardware natively supports management of some functions via SNMP. SNMP is a data driven protocol; operations are fundamentally either retrieve or write to a single data element or possibly a group of elements.

A computer library function can perform nearly any arbitrary function. However, almost any function that exists can be logically decomposed into a series of data operations (i.e., write and retrieve), and exploitation usage operations of those data operations (i.e., analyze or perform some function of the data). This decomposition is important as it provides a mechanism for decomposing library functions into data driven operations while retaining usage exploitations. The retrieve and write operations operate on data, while usage operations manipulate on previous instantiated data, and possibly provide output data.

In view of the above, it would be advantageous to have an RPC mechanism for arbitrary user space libraries over existing system management protocols, specifically SNMP.

SUMMARY OF THE INVENTION

The present invention provides a method for a semi-automatic mapping of a library definition to an SNMP management information base (MIB). The method of the present invention allows for bridging the differences between SNMP, a data driven protocol, and an arbitrary library, which is function driven, in order to expose the library's internal data structures, data operations, and usages operations as SNMP data structures. These data structures defined in the MIB are directly readable and, in some cases, writable by SNMP client applications.

For an arbitrarily complex library, the semi-automatic mapping of a library definition to an SNMP management information base may produce a large number of data operators and usages operators in the MIB. However, the value is that the large class of SNMP applications may be used to interface to a library that is not inherently network aware.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
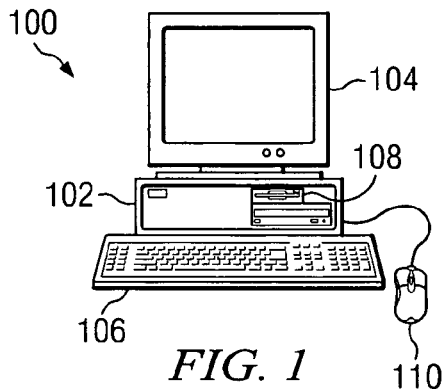
FIG. 1 shows a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
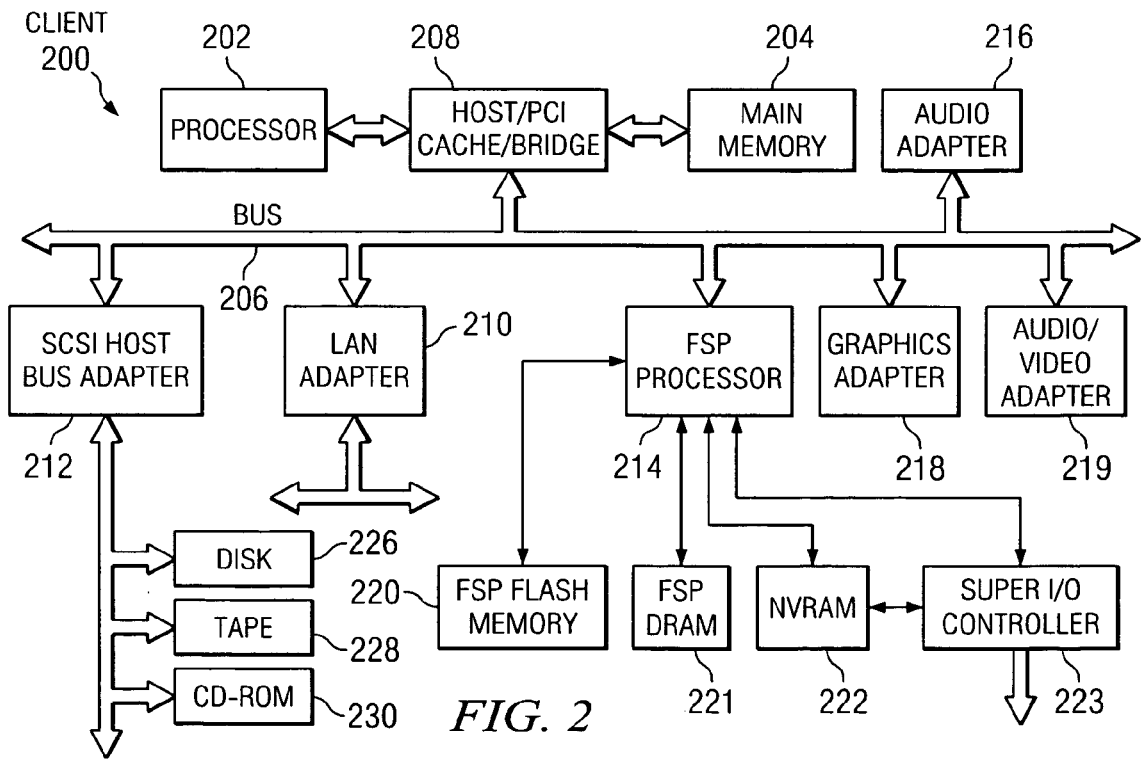
FIG. 2 shows a diagram of elements of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and flexible service processor (FSP) processor 214 are connected to PCI local bus 206 by direct component connection. In contrast, audio adapter 216, graphics adapter 218, and audio/video adapter 219 are connected to PCI local bus 206 by add-in boards inserted into expansion slots.

FSP processor 214 is connected to FSP flash memory 220, FSP dynamic random access memory (DRAM) 221, NVRAM 222, and super I/O controller 223. Super I/O controller 223 also has a connection to NVRAM 222. All of these components form a FSP unit or module. FSP flash memory 220 is an example of the flash memory in which microcode used for an initial program load (IPL) may be stored. FSP DRAM 221 is a memory in which LIDs or microcode from FSP flash memory 220 are loaded for execution by FSP processor 214. NVRAM 222 may be used to hold data that is to be retained when the system is powered down. Super I/O controller 223 provides an interface to devices, such as a keyboard, mouse, and microphone.

SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, or in one or more peripheral devices 226-230.

Simple Network Management Protocol is a protocol governing network management and the monitoring of network devices and their functions. Though it is commonly used in TCP/IP networks, it is not necessarily limited to TCP/IP networks.

A remote call procedure (RPC) is a type of protocol that allows a program on one computer to execute a program on another computer, typically a server. Using RPC, a system developer need not develop specific procedures for the server. The client program sends a message to the server with appropriate arguments, and the server returns a message containing the results of the program executed.

The present invention provides an innovative remote procedure call mechanism for remote access of arbitrary user space libraries over existing system management protocols, preferably SNMP. An arbitrary user space library is any shared library or any library on a system a user can access.

The present invention allows a semi-automatic (or in alternative embodiments, fully automated) mapping of library definitions to an SNMP MIB. By exposing the internal data, operations, and usages operations as SNMP data structures which can be directly modified over the network, the internal data, operations, and usages operators can be modeled remotely in a data driven protocol.

Figure 3:
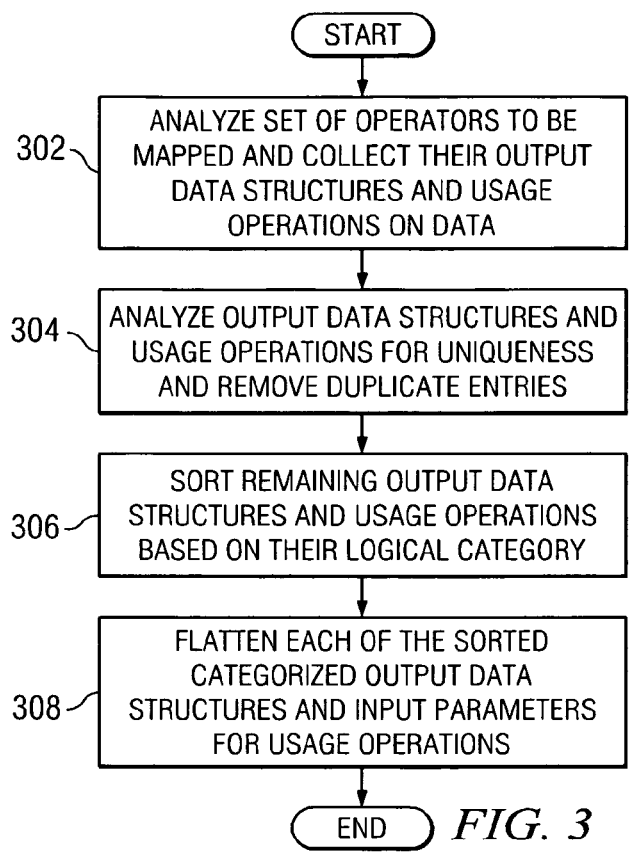
FIG. 3 shows a flowchart for implementing a preferred embodiment of the present invention.

In a preferred embodiment, the innovative mapping is done in the following steps, depicted in FIGS. 3 and 4. First, the set of all operators that are to be mapped are analyzed and their output data structures and usage operations on data are collected (step 302). The output data structures and usage operations are analyzed for uniqueness and duplicate entries are removed (step 304). The remaining output data structures and usage operations are sorted based on their logical category (e.g., the logical categories are specified by the user or supplied from memory) (step 306). Each of the sorted categorized output data structures and input parameters for usage operations is flattened, with the steps shown in FIG. 4 (step 308).

Figure 4:
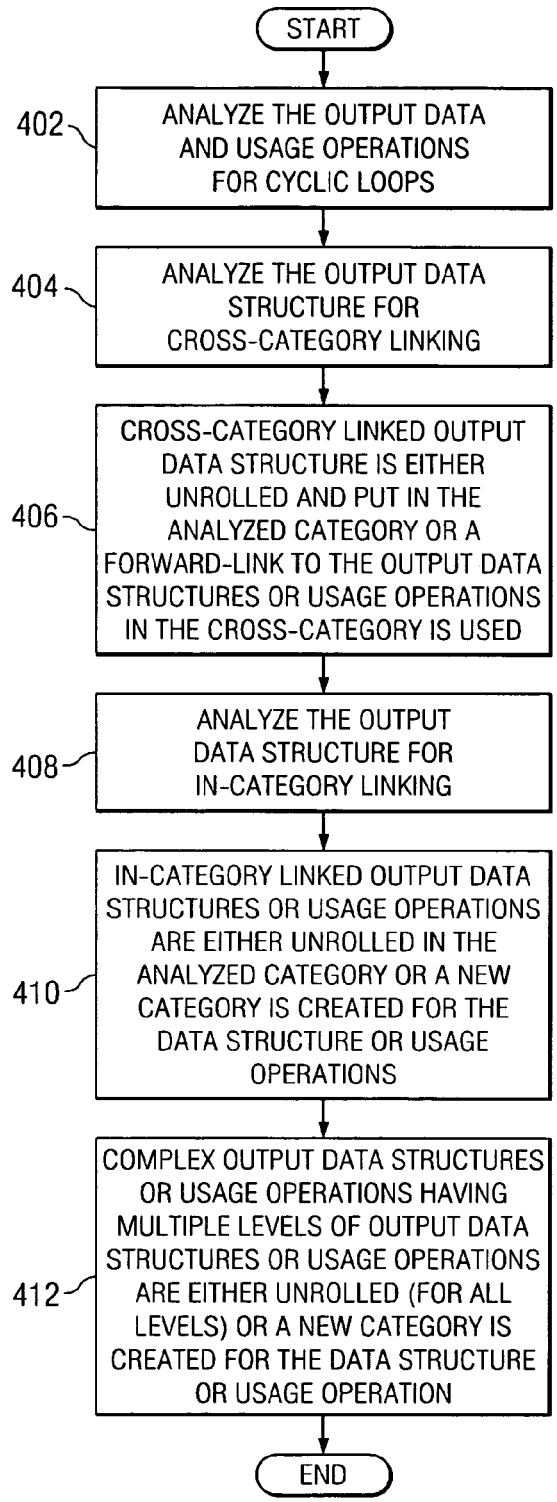
FIG. 4 shows a flowchart for implementing a preferred embodiment of the present invention.

FIG. 4 shows the steps for flattening of the output data structures. First, they are analyzed for cyclic loops (step 402), which are removed. Next, they are analyzed for cross-category linking (step 404), and the linking, preferably based on user preference specified by the user or supplied from memory/hard disk, is either unrolled and put in the analyzed category or a forward-link to the output data structures or usage operations in the cross-category is used (step 406). Next, the output data structures are analyzed for in-category linking (step 408), and the linked output data structure or usage operation is either unrolled in the analyzed category or a new category is created for data structure or usage operation (step 410), depending on the preference specified by the user or supplied from memory/hard disk. Finally, the output data structures or usage operation which are complex and have multiple levels of output data structures or usage operations are either unrolled (for all levels) or a new category is created for data structure or usage operation (step 412), again depending on the user preference or information supplied from memory/hard disk.

Figure 5:
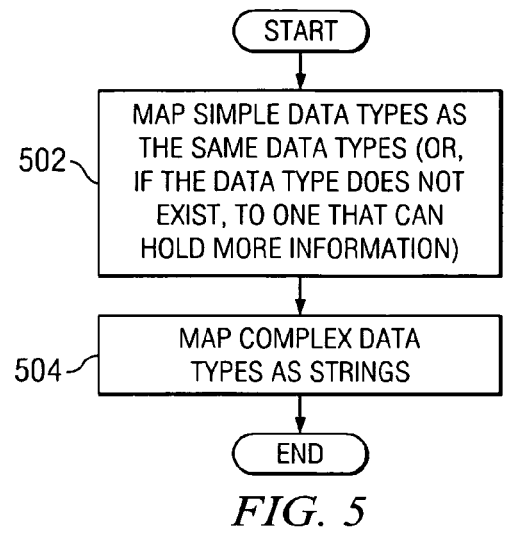
FIG. 5 shows a flowchart for implementing a preferred embodiment of the present invention.

For each of the categorized, analyzed cyclic loops, cross-category linking, in-category linking, and unrolling steps of FIG. 4, the output data structure is mapped in a data format as shown in FIG. 5. First, simple data types are mapped as respectively the same data types or (if they do not exist) to one that can hold more information (step 502); and complex data types are mapped as strings (step 504).

Figure 6:
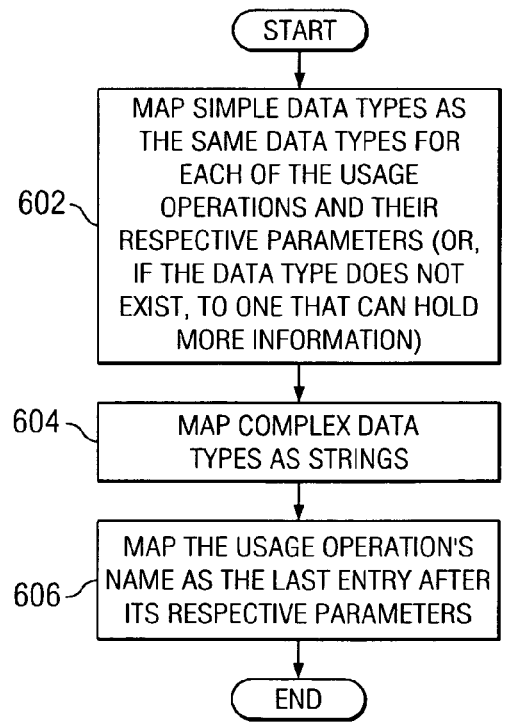
FIG. 6 shows a flowchart for implementing a preferred embodiment of the present invention.

For the categorized usage operations which parameters are analyzed for cyclic loops, cross-category linking, in-category linking, and unrolling are mapped in a data format as shown in FIG. 6. First, for each of the usage operation and their respective parameters, simple data types are mapped as respectively the same data types or if they don't exist, then to one that can hold more information (step 602). Next, complex data types are mapped as strings (step 604). Finally, the usage operation name is mapped as the last entry after its respective parameters (step 606).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of accessing data across a network, the computer implemented method comprising collecting output data structures and usage operations on data for a set of functions;

analyzing the output data structures and usage operations for uniqueness, wherein unique output data structures and unique usage operations are retained and duplicate entries are removed;

sorting the unique output data structures and usage operations based on logical categories, wherein the logical categories are specified by a user or supplied from memory;

flattening the unique output data structures and the unique usage operations, wherein linked unique output data structures or the unique usage operations are unrolled and put in an analyzed category;

identifying and removing cyclic loops in the unique output data structures;

analyzing the unique output data structures for cross-category linking, wherein the cross-category linking is unrolled and put in the analyzed category, and wherein a forward-link to the unique output data structures or the unique usage operations in the cross-category linking is used;

analyzing the unique output data structures for in-category linking;

responsive to a preference specified by one of the user or memory, performing one of an unrolling the unique output data structures or the unique usage operations having multiple levels or creating a new category for the unique output data structures or the unique usage operations;

mapping the unique data structure in a data format that comprises mapping a simple data type as a same data type, and mapping a complex data type as a string;

mapping the simple data type as the same data type for each of the unique usage operations and their respective parameters;

mapping the complex data type as the string; and mapping a usage operation name after respective parameters of the unique usage operations.

* * * * *